United States Patent

Okazaki et al.

[11] Patent Number: 5,819,048
[45] Date of Patent: *Oct. 6, 1998

[54] IMAGE DATA PROCESSING APPARATUS TRANSMITTING DATA IN ACCORDANCE WITH A RECEPTION RATE

[75] Inventors: Hiroshi Okazaki, Yokohama; Hiroaki Sato, Kawasaki, both of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 674,742

[22] Filed: Jul. 2, 1996

[30] Foreign Application Priority Data

Jul. 4, 1995 [JP] Japan ................................... 7-168705
Jun. 7, 1996 [JP] Japan ................................... 8-145733

[51] Int. Cl.$^6$ .............................. H04N 5/00; H04L 23/00
[52] U.S. Cl. ................................ 395/200.63; 395/200.34; 395/200.62; 395/200.77; 395/558; 395/559; 345/329; 345/330; 348/7; 348/12; 348/13; 348/15; 348/19; 348/552; 348/412; 348/423; 375/225; 375/224; 370/260; 370/270
[58] Field of Search ..................... 395/200.63, 200.64, 395/200.34, 200.62, 200.77, 559, 558, 556; 348/7, 12, 16, 15, 19, 552, 423, 412; 370/260, 263, 265, 266, 270; 375/356, 225, 224; 345/329, 330

[56] References Cited

U.S. PATENT DOCUMENTS

| | | | |
|---|---|---|---|
| 5,231,492 | 7/1993 | Dangi et al. | 348/17 |
| 5,289,582 | 2/1994 | Hirata et al. | 395/849 |
| 5,367,522 | 11/1994 | Otani | 370/468 |
| 5,375,068 | 12/1994 | Palmer et al. | 395/200.34 |
| 5,534,929 | 7/1996 | Tanaka | 348/405 |
| 5,537,150 | 7/1996 | Sugiyama et al. | 348/558 |
| 5,586,151 | 12/1996 | Minagawa | 375/337 |
| 5,598,416 | 1/1997 | Yamada et al. | 370/468 |
| 5,608,653 | 3/1997 | Palmer et al. | 395/200.34 |

OTHER PUBLICATIONS

IEEE INFOCOM'94, Proceedings vol. 3, "A rate control mechanism for packet video in the Internet", pp. 1216–1223.

Primary Examiner—Emanuel T. Voeltz
Assistant Examiner—Tuan Q. Dam
Attorney, Agent, or Firm—Fitzpatrick, Cella, Harper & Scinto

[57] ABSTRACT

Image data processing apparatus transmitting data in according with a reception rate includes a receiver for receiving information data transmitted from at least one external terminal, and calculating circuitry for calculating a reception rate of the information data received by the receiver. The reception rate is calculated continuously or at every predetermined transmission time interval. A transmitter then transmits the calculated rate data. Preferably, in a video conferencing system, data is transmitted and received at an appropriated rate.

37 Claims, 10 Drawing Sheets

| TRANSMISSION NODE | TRANSMISSION RATE | | RECEPTION RATE | |
|---|---|---|---|---|
| | REQUEST | RESULT | MOTION PICTURE | AUDIO |
| host1 | 306⤴ ◀ 15.0fps ▶ 301 ↙307 MANUAL MODE ↙305 | 14.3fps ~302 | host2  90% host3  85% ↘303 | 100% 100% ↙304 |
| host2 | ◀ 15.0fps ▶ MANUAL MODE | 13.8fps | host1  80% host3  75% | 100% 100% |
| host3 | ◀ 15.0fps ▶ MANUAL MODE | 14.9fps | host1  100% host2  95% | 96% 100% |

IMAGE DATA PROCESSING APPARATUS TRANSMITTING DATA IN ACCORDANCE WITH A RECEPTION RATE

BACKGROUND OF THE INVENTION

1. Field of the Invention

The present invention relates to an information data processing apparatus and, more particularly, to a data amount control when information data is transmitted to a plurality of terminal apparatuses as in a television conference system.

2. Related Background Art

In a conventional television conference system, it is a general way that although an initial frame rate is preset depending on a situation such as number of nodes, communication line speed, or the like, the frame rate is not changed during the communication.

Particularly, in the case where a video conference is performed by using computers such as workstations, personal computers, or the like, the frame rate on the transmission side cannot be automatically adjusted in accordance with a change in situation on the reception side such as a load situation of a CPU (Central Processing Unit), or the like.

Therefore, since the transmission side transmits at a transmission rate higher than it is needed, a load larger than it is needed is required for a transmitting process, so that it causes a deterioration of a reception ability in a receiving process which is simultaneously executed. Therefore, although the user manually adjusted the transmission rate to a proper value, an automatic adjusting function is not realized yet.

However, when a motion picture is transmitted at a transmission frame rate such that all of a plurality of reception nodes corresponding to a certain transmission node causes a drop-out of frames, a processing ability resource such as a CPU or the like is used in vain.

When the frame drop-out occurs on the reception side, the receiving operation of every other frame is likely to be performed, a display rate on the reception side is reduced to ½, and the like, namely, there is a tendency such that the ability rapidly deteriorates without gradually and slowly deteriorating.

In the TV conference or the like, the same node simultaneously executes the transmission and reception data, so that the deterioration in reception rate contrarily provides the processing ability, so that it causes a meaningless increase in transmission rate.

Therefore, it is considered that the user manually adjusts the transmission rate to a proper value. However, since the adjustment is complicated for the user and a proper frame rate momentarily changes depending on a situation change such as participation, leaving, or the like, an automatic adjusting method is required.

In the TV conference or the like, in order to smoothly progress the conference, it is considered that a stable audio transmitting and receiving process without a sound drop-out, a leading process of a tool for another cooperative work, a rapid response in the interactive operation, and the like have priorities higher than that in the transmitting and receiving process of the motion picture. In such a case, it is considered that it is necessary to assure the processing ability of the CPU for another process by deteriorating the motion picture frame rate and temporality decreasing a processing load of the motion picture transmission and reception.

SUMMARY OF THE INVENTION

From a viewpoint of the above-mentioned background, it is an object of the invention to provide an information data processing apparatus for preventing a transmission of information data that results in a vain use of a processing ability of a CPU or the like and for enabling the information data of a proper amount of data according to a situation to be transmitted.

According to one preferred embodiment, therefore, there is provided an information data processing apparatus comprising: transmitting means for transmitting first information data; and control means for controlling a transmission data amount of the first information data which is transmitted by the transmitting means in accordance with a reception rate of the first information data on the reception side.

In one preferred embodiment, there is an information data processing apparatus connected to a plurality of terminal apparatuses for transmitting and receiving information data, comprising: input means for inputting reception rate data indicative of a reception rate of the information data from the plurality of terminal apparatuses; deciding means for deciding an information data amount when the information data is transmitted in accordance with the reception rate data; and transmitting means for transmitting a control signal to control the information data amount when the information data is transmitted in accordance with an output of the deciding means to the plurality of terminal apparatuses.

According to one preferred embodiment, there is provided an information data processing apparatus comprising: receiving means for receiving information data transmitted from an external terminal; calculating means for calculating a reception rate of the information data received by the receiving means; and transmitting means for transmitting reception rate data indicative of the reception rate calculated by the calculating means.

Other objects, features and advantages of the invention will become apparent from the following detailed description taken in conjunction with the accompanying drawings.

DETAILED DESCRIPTION OF THE PREFERRED EMBODIMENTS

Figure 1:
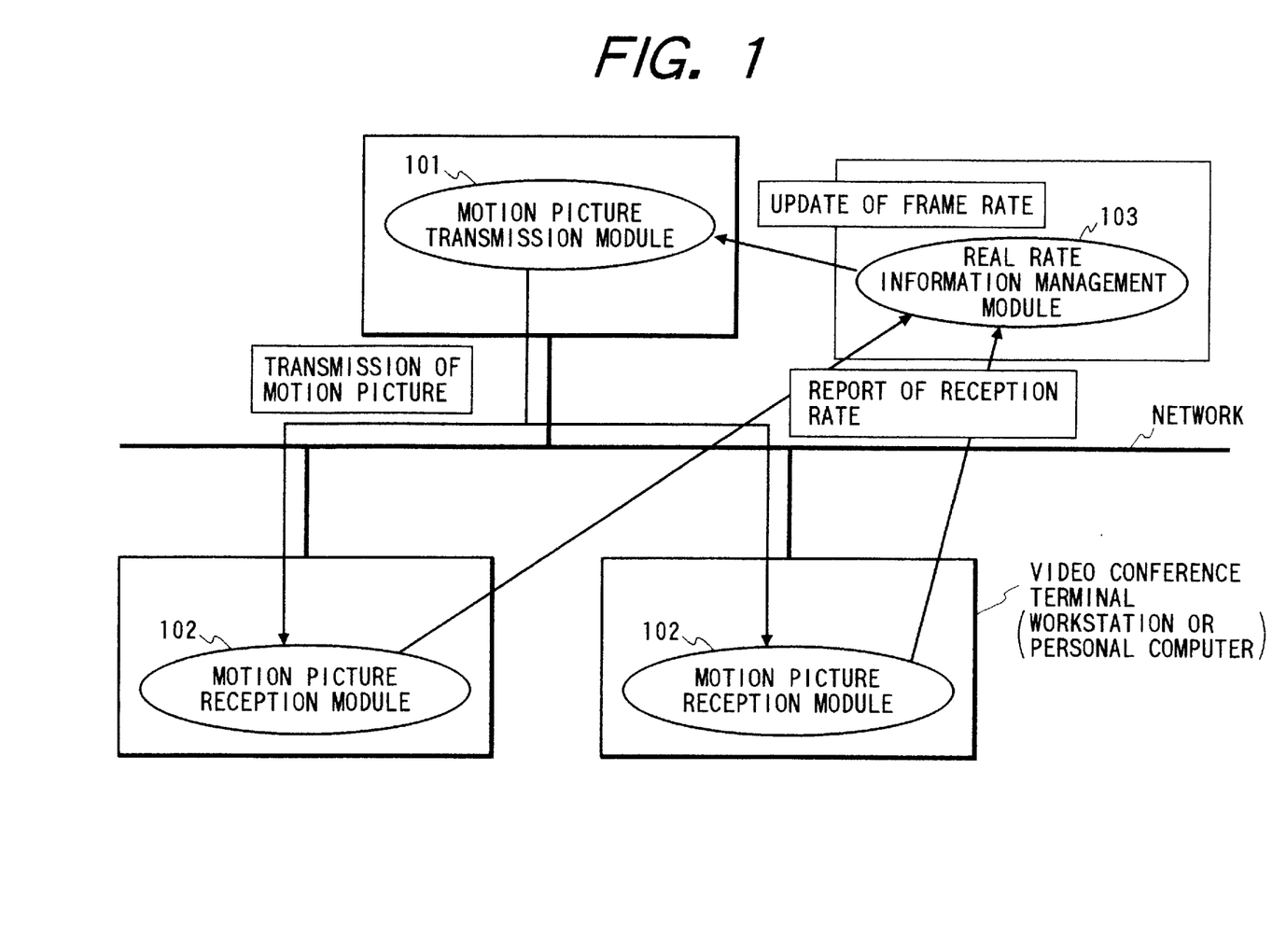
FIG. 1 is a constructional diagram of a functional module in first embodiment.

FIG. 1 is a constructional diagram of a functional module for realizing the first embodiment.

In FIG. 1, reference numeral 101 denotes a motion picture transmission module; 102 motion picture reception module; and 103 a real rate information management module.

Figure 2:
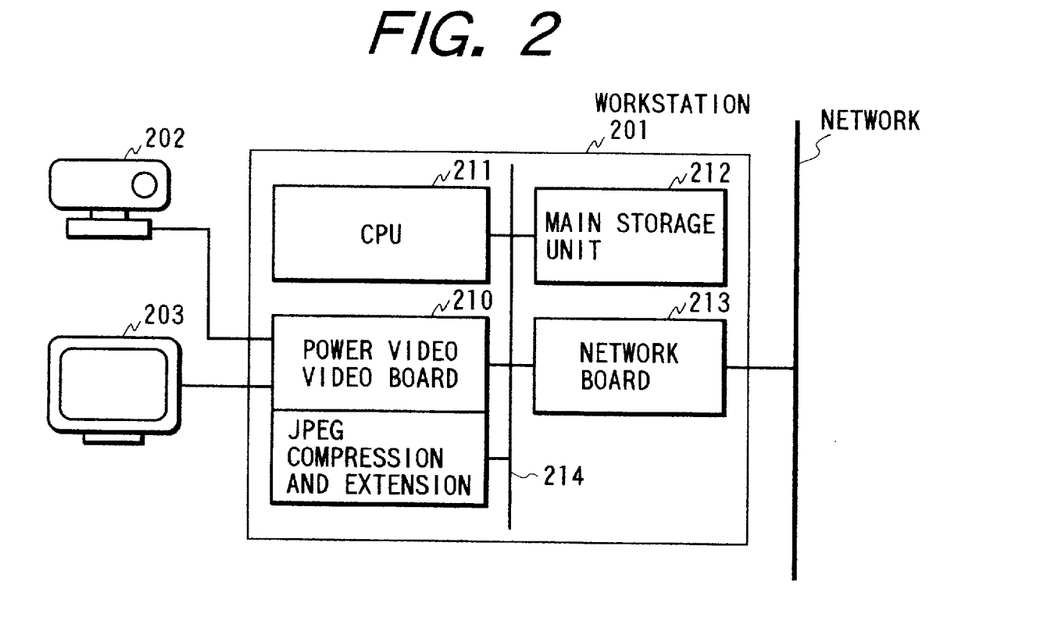
FIG. 2 is a constructional diagram of a hardware of a workstation which realizes the first embodiment.

FIG. 2 is a hardware constructional diagram of a workstation for realizing the embodiment.

In FIG. 2, reference numeral 201 denotes a workstation; 202 a camera connected to the workstation 201; and 203 a display connected to the workstation 201.

The workstation 201 comprises: a video board 210 having a Power Video manufactured by Parallax Co., Ltd. for compressing and extending a camera motion image; a central processing unit (CPU) 211 for controlling the camera 202 and display 203 which are connected to the workstation 201 and circuit boards in the workstation; a main storage unit 212 such as hard disk, memory, or the like for storing control data and data transmitted through a network; a network board 213 for transmitting or receiving data to/from the network; and a data bus 214 for transmitting data in the workstation 201. The modules 101 to 103 in FIG. 1 are realized as a software.

The motion picture transmission module, motion picture reception module, and real rate information management module will now be explained hereinbelow.

The motion picture transmission module obtains data in which the present motion picture frame was JPEG (Joint Photographic Coding Experts Group) compressed by using the Power Video and, after that, transmits the obtained data in a packet form to a plurality of motion picture reception modules by using a UDP/IP network protocol. By repeating such motion picture frame capture and motion picture transmission, the transmission module executes the motion picture transmission.

In the motion picture transmission module, a function such that a weight is inserted every above-mentioned repetitive loop by a system call usleep ( ) of UNIX or the like, thereby adjusting the real transmission frame rate is realized.

The motion reception module waits for the arrival of the packet from the transmission module. When one motion picture frame is obtained, the reception module extends and displays the frame by using the Power Video. Since the retransmission due to errors is not performed in the UDP/IP protocol, the packet is lost due to a confusion in the network, a CPU load of the workstation on the reception side, or the like.

In the packet to be transmitted from the transmission side, serial number information is arranged in the packet data and a lost amount of the packet data can be measured on the reception side by checking the omission of the serial number.

The reception module calculates a reception rate [=(received frames)/(received frames+lost frames)] at every predetermined time interval (about one second) and informs the real rate information management module of the reception rate.

Processes of the real rate information management module in the embodiment will now be described with reference to FIG. 3.

Figure 3:
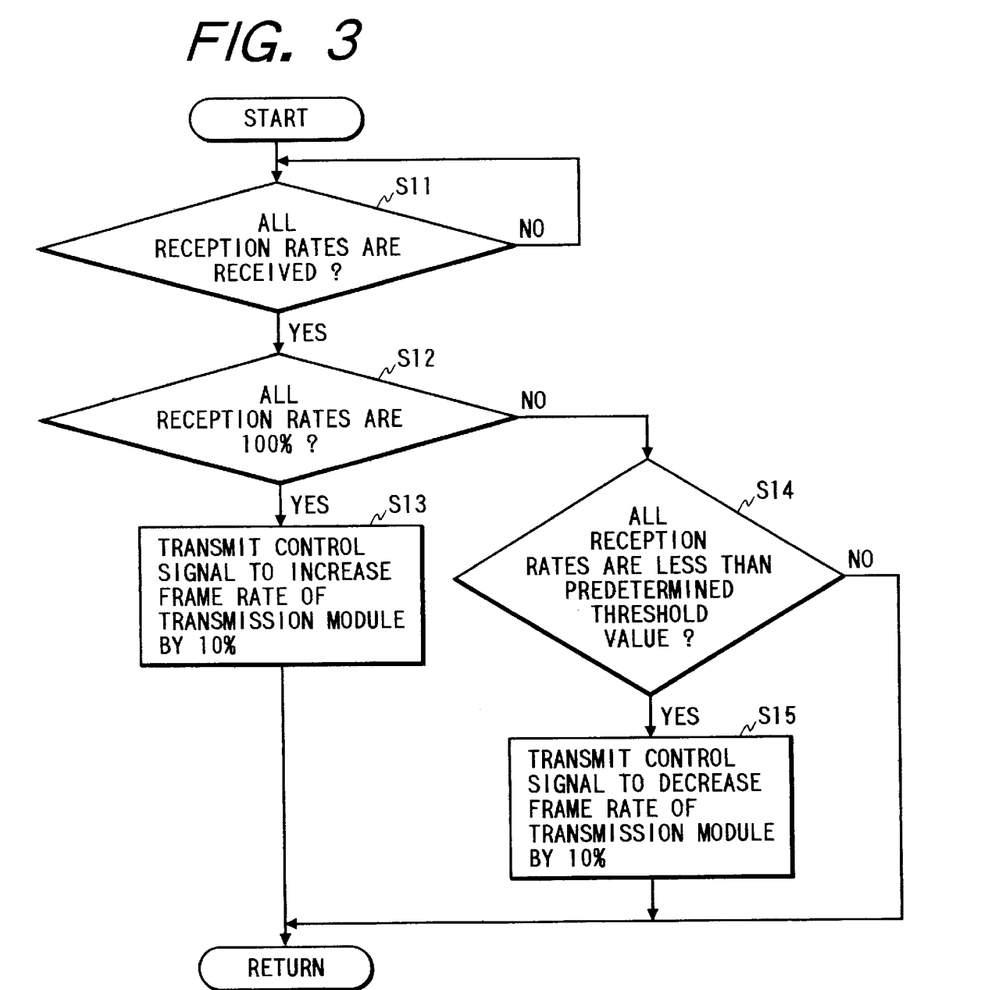
FIG. 3 is a flowchart showing a frame rate control process of a real rate information management module in the first embodiment.

FIG. 3 is a flowchart showing a transmission frame rate control process of the real rate information management module. A transmission frame rate control is performed by the CPU in the workstation.

The real rate information management module controls the frame rate on the transmission side on the basis of the reception rates from a plurality of reception modules which receive a motion picture transmitted from a certain transmission module.

In FIG. 3, a check is made in step S11 to see whether the reception rate data from all of the reception modules has been received or not. If NO, the apparatus waits until the reception rate data of all of the reception modules are received. If YES, step S12 follows.

Figure 4:
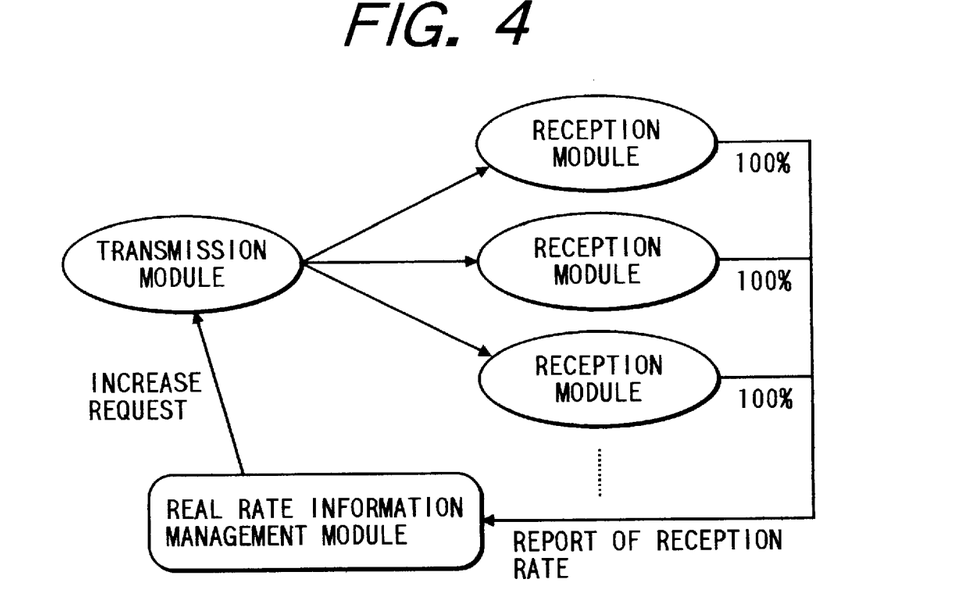
FIG. 4 is a diagram schematically showing a frame rate updating judgment (increase)

It is judged in step S12 whether all of the reported reception rates are equal to 100% or not. If YES, step S13 follows and a control signal to increase the frame rate on the transmission side at a predetermined ratio (10% in the embodiment) is transmitted to the transmission module side (for example, in case of FIG. 4).

When all of the reception rates are not equal to 100% in step S12, step S14 follows and a check is made to see whether all of the reported reception rates are less than a predetermined threshold value (90% in the embodiment) or not.

Figure 5:
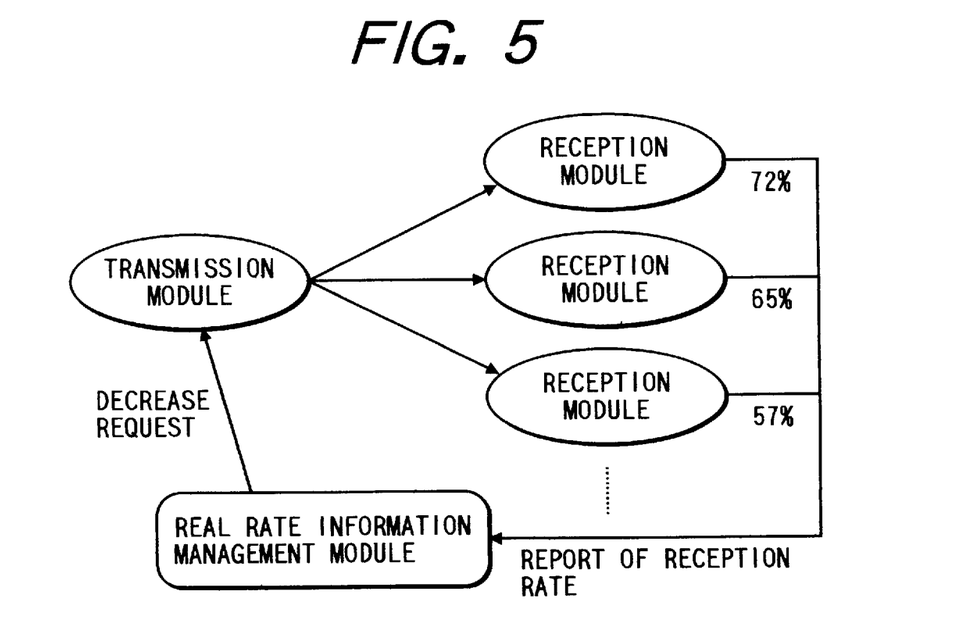
FIG. 5 is a diagram schematically showing a frame rate updating judgment (decrease)

If YES, step S15 follows and the control signal for decreasing the frame rate at a predetermined rate (10% in the embodiment) is transmitted to the transmission module side (for example, in the case of FIG. 5).

Figure 6:
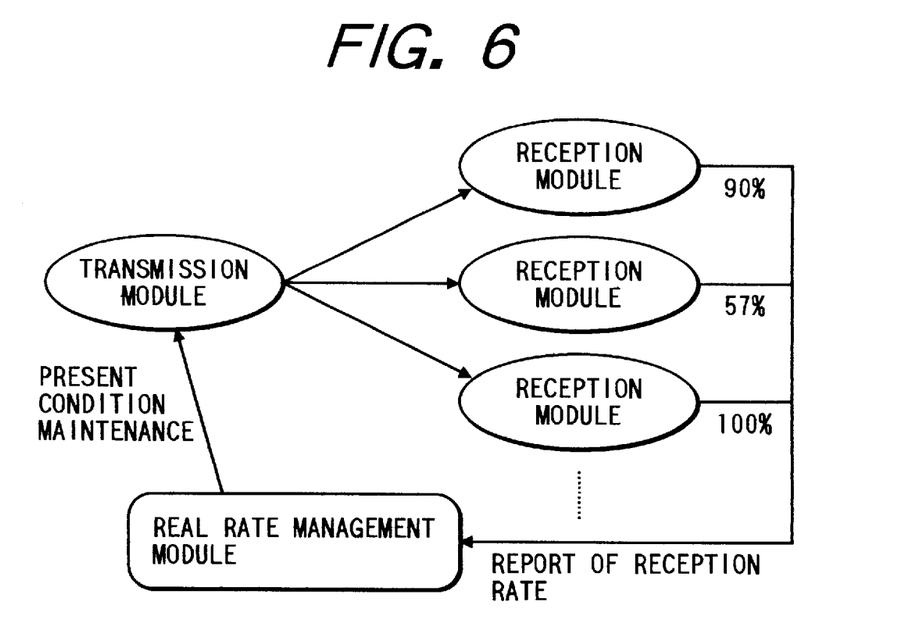
FIG. 6 is a diagram schematically showing a frame rate updating judgment (maintenance)

In the case where all of the reported reception rates are equal to or larger than the predetermined threshold value in step S14, the present frame rate is maintained (for example, the case of FIG. 6).

That is, when the change judgment of increase or decrease in frame rate is performed, the real rate information management module immediately generates a request to the motion picture transmission module and the motion picture transmission module adjusts the transmission rate.

In a situation such that all users who participate in a video conference execute the motion picture transmission, when the user independently automatically adjusts the transmission rate by using the first embodiment, there is a case where variations occur in the transmission rates among the participants.

Since a balance among the participants is important in the video conference, a method of controlling in a manner such that the first embodiment is modified, the change judgment of the transmission rate is performed on a unit basis of a video conference, and the transmission rates of the motion picture transmission modules of all participants of the conference are simultaneously interlocked and controlled will now be described hereinbelow.

In the second embodiment, the change judgment of the transmission frame rate for each transmission module is decided to be any one of "increase", "decrease", and "maintenance".

If the change judgments of all of the participants of the conference denote "all increase" (one person or more) or "maintenance", the change judgment of the conference is decided to be "increase".

If the change judgments of all of the conference participants indicate "all decrease" (one person or more) or "maintenance", the change judgment of the conference is decided to be "decrease". In other cases, the change judgment of the conference is decided to be "maintenance".

Figure 7:
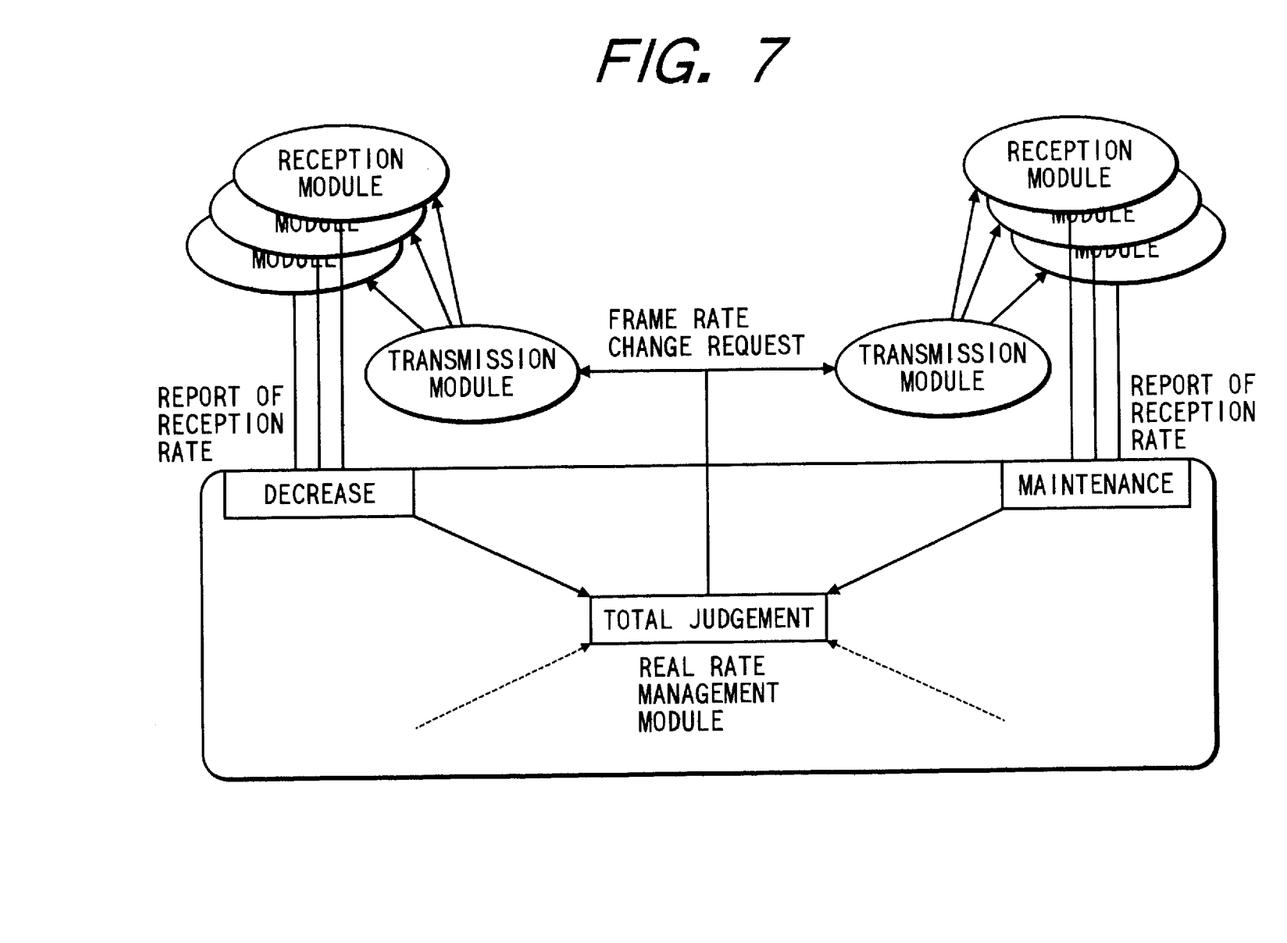
FIG. 7 is a diagram schematically showing a simultaneous control of transmission frame rates of a plurality of motion picture transmission modules in the second embodiment.

When the judgment of the conference is decided to be "increase" or "decrease", its request is generated to all of the motion picture transmission modules of all of the conference participants at that time point, thereby adjusting the transmission rate (refer to FIG. 7).

Figure 8:
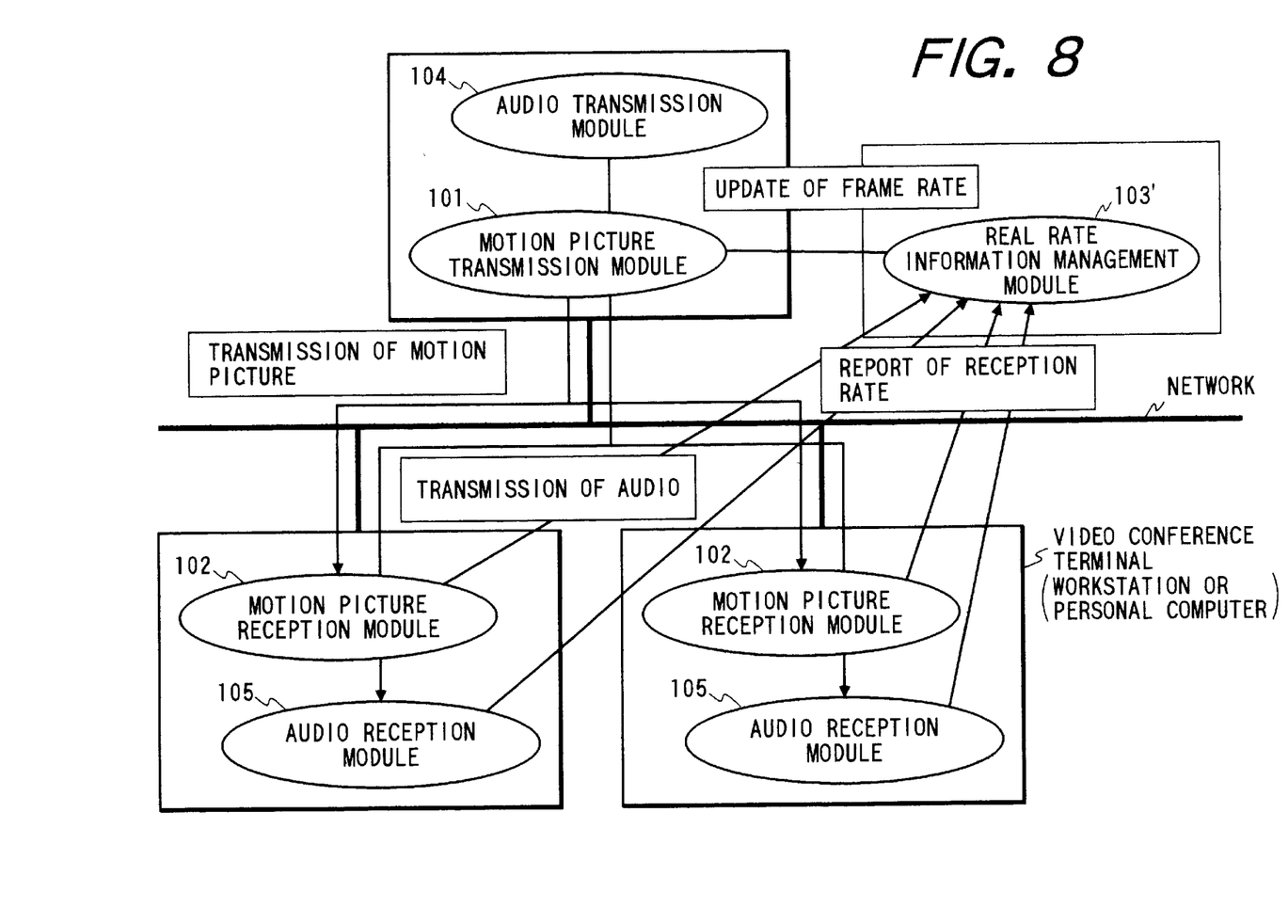
FIG. 8 is a constructional diagram of a functional module in the third embodiment.

FIG. 8 is a constructional diagram of a functional module to realize the third embodiment. In FIG. 8, the same component elements as those in FIG. 1 are designated by the same reference numerals and their descriptions are omitted here.

In FIG. 8, reference numeral 104 denotes an audio transmission module and 105 indicates an audio reception module. The modules 101 to 105 in FIG. 8 are realized as softwares.

Figure 9:
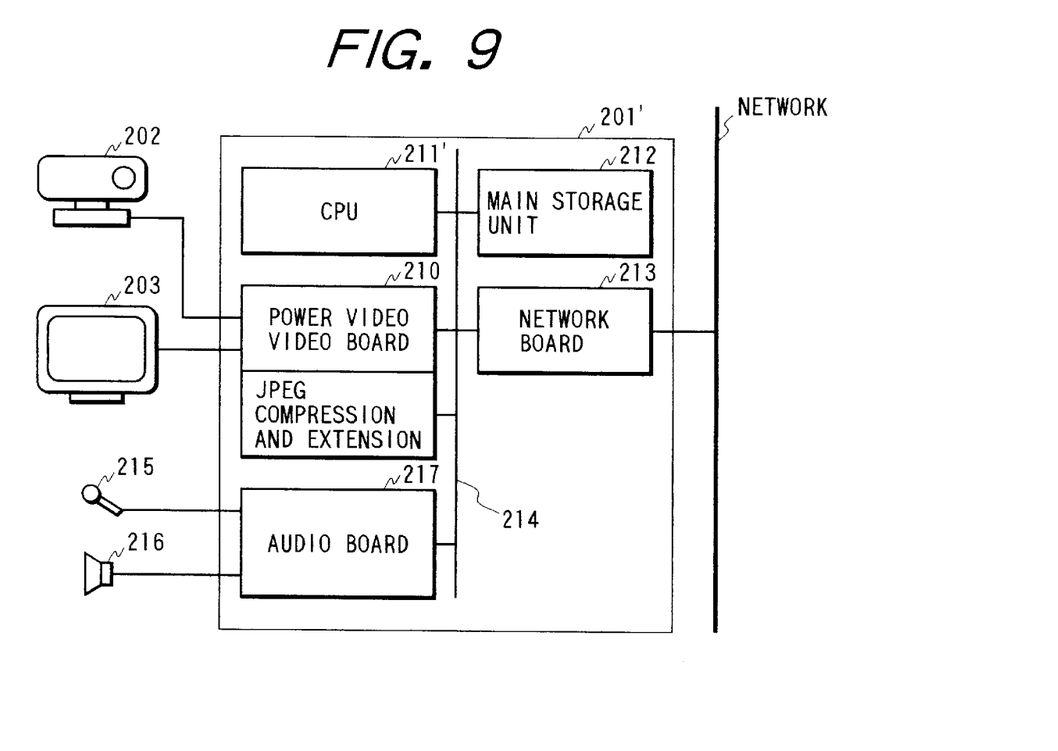
FIG. 9 is a constructional diagram of a hardware of a workstation for realizing the third embodiment.

FIG. 9 is a constructional diagram of a hardware of a workstation for realizing the embodiment. In FIG. 9, the same component elements as those in FIG. 2 are designated by the same reference numerals and the explanations are omitted.

In FIG. 9, reference numeral 215 denotes a microphone; 216 a speaker for generating audio sound; and 217 an audio board having a circuit for compressing and extending audio data.

Processes of the audio transmission module, audio reception module, and real rate information management module will now be described hereinbelow. Since the processes of the motion picture transmission module and motion picture reception module are similar to those in the first embodiment, their descriptions are omitted.

After an audio device was opened, the audio transmission module obtains audio data by a read system call. After that, the audio transmission module transmits the audio data to a plurality of audio reception modules by using the UDP/IP network protocol. By repeating the audio capture and audio transmission, the transmission module performs the audio transmission.

In case of audio sounds, there is no conception serving as a reference unit of the transmission such as a motion picture frame. Since the audio sounds are continuous media having no intervals, the transmission is repetitively performed while dividing the audio data into packets by setting the audio data of a certain unit time (about 0.01 to 0.2 second) to a unit.

The audio reception module waits for the arrival of the packets from the transmission module. When the audio data of one packet is obtained, the audio reception module writes it into the audio device by a write system call and reproduces audio sounds.

Figure 10:
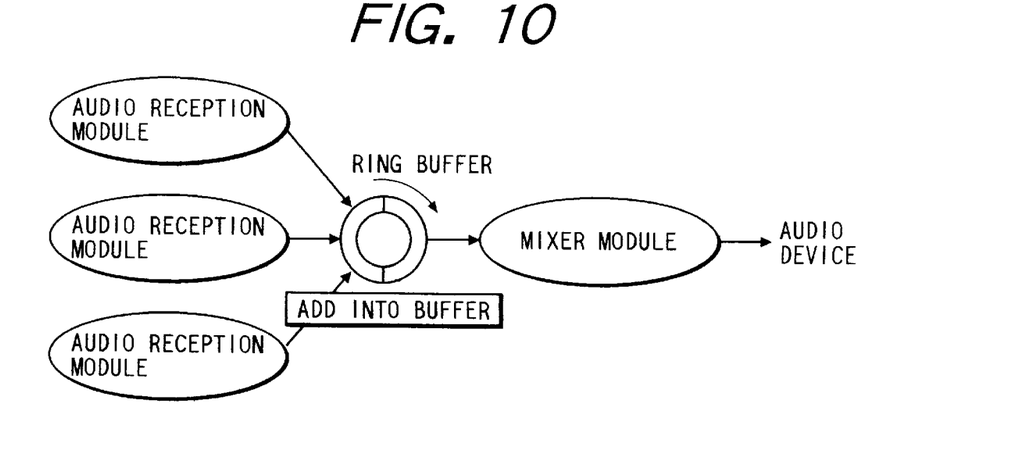
FIG. 10 is a diagram schematically showing a reception of a plurality of audio sounds and an audio reproduction.

When a plurality of audio sounds are simultaneously received, values of the received audio data are sequentially added to a ring buffer shown in FIG. 10. In this instance, since each reception module adds the value to the buffer, a plurality of audio sounds are mixed. A mixer module sequentially writes the mixed data on the buffer into the audio device every predetermined time interval by the write system call, reproduces the audio sounds, and after that, clears the buffer in a reproduction interval to 0.

In a manner similar to the motion image, the UDP/IP protocol is also used for the audio sounds, so that the packets are prevented from lost due to a crowd of network or a load of the CPU on the reception side, resulting in a cause of a sound drop-out or the like. Since serial number information has been added to the packets from the transmission side, a lost amount of packets can be measured by checking the drop-out of the serial numbers.

The audio reception module calculates a reception rate [=(the number of received packets)/(the number of received packets+the number of lost packets)] every predetermined time interval (about one second) and informs the real rate information management module of the reception rate.

Processes of the real rate information management module of the embodiment will now be described with reference to FIG. 11.

Figure 11:
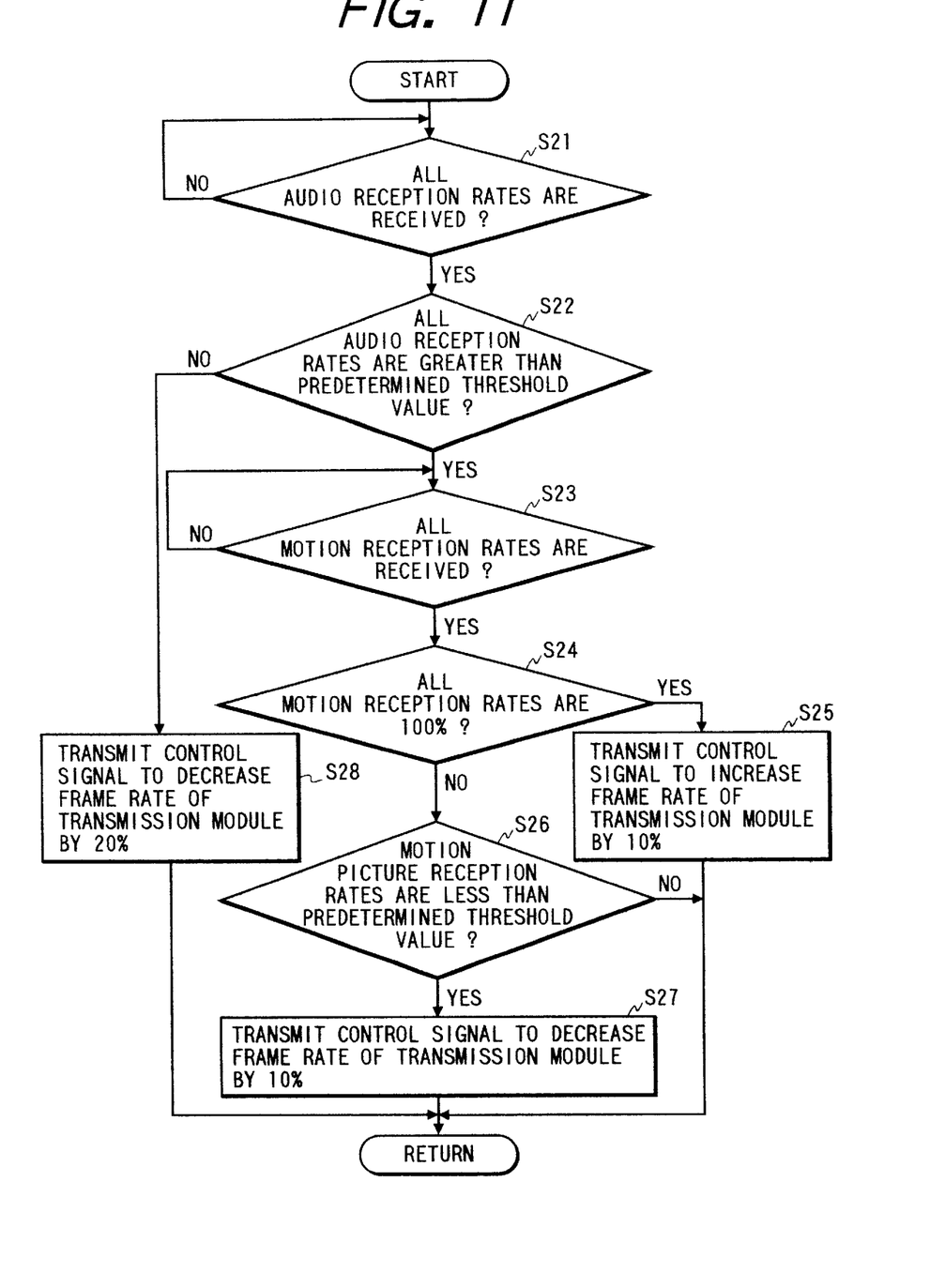
FIG. 11 is a flowchart showing a frame rate control process of the real rate management module in the third embodiment.

FIG. 11 is a flowchart showing a transmission frame rate control process of the real rate information management module. The transmission frame rate control is performed by the CPU in the workstation.

The real rate information management module controls the transmission frame rate of the motion image data on the transmission side in accordance with motion picture reception rates and audio reception rates from a plurality of reception modules which receive motion images and audio data transmitted from a certain transmission module.

The embodiment is based on an idea such that a stable receiving process of audio data has a higher priority than that of a process of improving the frame rate of the motion image data and audio transmitting and receiving processes are stabilized by decreasing the frame rate in order to recover the stable receiving process.

In FIG. 11, a check is made in step S21 to see whether the audio reception rates from all of the audio reception modules have been received. If NO, the apparatus waits until the reception rate data of all of the sound reception modules are received. If YES, step S22 follows.

In step S22, if all of the reported audio reception rates are greater than a predetermined threshold value (90% in the embodiment), step S23 follows. If NO, step S28 follows.

In step S28, a control signal to decrease the frame rate on the transmission side at a predetermined rate (20% in the embodiment) is transmitted to the transmission module side.

In step S23, a check is made to see if the reception rate data from all of the motion picture reception modules have been received. If NO, the apparatus waits until the reception rate data of all of the motion picture reception modules are received. If YES, step S24 follows.

In step S24, a check is made to see whether all of the reported motion picture reception rates are equal to 100% or not. If YES, step S25 follows and a control signal to increase the frame rate on the transmission side at a predetermined rate (10% in the embodiment) is transmitted to the transmission module side.

On the other hand, when all of the motion picture reception rates are not equal to 100% in step S24, step S26 follows and it is judged whether all of the reported motion picture reception rates are less than a predetermined threshold value (about 90% in the embodiment) or not.

When all of the reported motion picture reception rates are less than the predetermined threshold value in step S26, step S27 follows and a control signal to decrease the frame rate at a predetermined rate (10% in the embodiment) is transmitted to the transmission module side.

When all of the reported motion picture reception rates are not less than the predetermined threshold value in step S26, the present frame rate is maintained.

That is, when a change judgment about the increase or decrease in frame rate is performed, the real rate information management module immediately generates a request to increase or decrease to the motion picture transmission module and the motion picture transmission module adjusts the transmission rate.

The fourth embodiment has a construction obtained by adding a frame rate manual adjusting function to the construction of the third embodiment.

The frame rate manual adjusting function by a user interface module will be first described.

Figure 12:
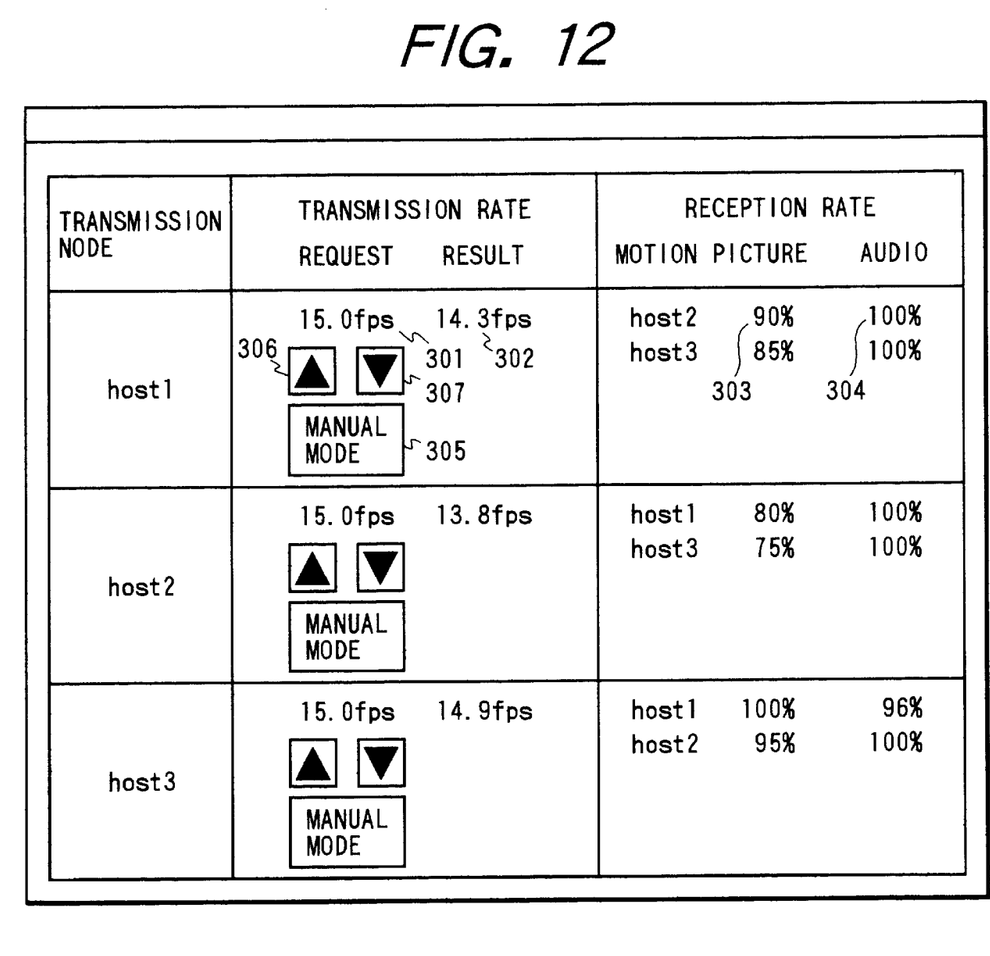
FIG. 12 is a diagram showing a display screen for a frame rate adjustment by a frame rate adjustment user interface.

The user interface module for displaying a list of the present requested frame rate and the real frame rate (since there is also a case where the data cannot be actually transmitted by the requested frame) of the transmission module of the motion image and the reception rates of the motion pictures and audio sounds of a plurality of reception modules corresponding to the transmission module to, for example, the display 203 as a window is provided for each terminal (refer to FIG. 12). Data shown in FIG. 12 is managed by the real rate information management module.

In FIG. 12, reference numeral 301 denotes a requested frame rate; 302 a real frame rate; 303 a motion picture reception rate of the reception module; and 304 an audio reception rate of the reception module. Values of those data are always updated irrespective of the automatic adjustment mode or manual adjustment mode, so that the user of each terminal can grasp the present situation.

Reference numeral 305 denotes a mode change key and 306 and 307 denote frame rate change keys.

The key operations of the mode change key 305 and frame rate change keys 306 and 307 are instructed by a mouse and are executed by clicking a mouse button.

In the mode change key 305, the automatic adjustment mode and the manual adjustment mode are switched every key operation. When the auto adjustment mode is switched to the manual adjustment mode, an initial request frame rate is set to a value of the requested frame rate just before a value in the automatic adjustment mode.

The frame rate change keys 306 and 307 can change the requested frame rate. The frame rate can be increased on an fps unit basis by the key operation of the frame rate change key 306. The frame rate can be decreased on an fps unit basis by the key operation of the frame rate change key 307. When the frame rate itself is less than 1 fps, the frame rate is increased or decreased on a 0.1 fps unit basis. The value of the frame rate is not smaller than 0.1. In this instance, "fps" denotes "frames per second (frames/second)".

In the automatic adjustment mode, when the frame rate change keys 306 and 307 are directly operated, the mode is automatically switched to the manual adjustment mode.

The user interface module transmits the following control signals to the real rate information management module for the operations as mentioned above.

Each time the mode change key 305 is operated, a control signal to set the auto adjustment mode or a control signal to set the manual adjustment mode is transmitted to the real rate information management module.

When the frame rate change key is operated, a control signal to set the requested frame rate to a designated value is transmitted to the real rate information management module.

In order to display a list, values of the requested transmission rate, real transmission rate, motion picture reception rate, audio reception rate, and the like are stored into a shared memory, thereby providing a realization form such that they can be always referred to from an arbitrary module.

The frame rate control by an application interface will now be described. The application interface provides a function library for requesting the operations corresponding to the above-mentioned control signals from other cooperative working programs. Actually, the functions to transmit the control signals transmitted by the user interface module to the real rate information management module are prepared in correspondence to the requested operations.

The following functions are provided here.

ReturnCode SetRateControlMode (SendHost, ModeType):

ReturnCode SetRateValue (SendHost,RateValue);

"SendHost" designates a terminal node which participates in the conference, "ModeType" designates the kind of manual/auto mode, and "RateValue" designates a designated rate value.

By using such functions, the motion picture transmission frame rate of the terminal node which exerts an influence on the own process in the application is temporarily decreased, the own process of a large load which is desired to be finished early is performed, the frame rate is recovered, and the mode is returned to the auto adjustment mode, so that the conference can be smoothly progressed.

As mentioned above, according to the embodiment, since the frame rate of the motion image data is controlled and transmitted in accordance with the motion image reception rate on the reception side which receives the motion image data, the transmission of the motion image data such that a processing ability of the CPU or the like is used in vain can be prevented and the motion image data can be transmitted at a proper motion picture frame rate according to a situation.

Many modifications and variations of the invention can be embodied without departing from the spirit and main features of the invention.

In other words, the foregoing description of embodiments has been given for illustrative purposes only and not to be construed as imposing any limitation in every respect.

The scope of the invention is, therefore, to be determined solely by the following claims and not limited by the text of the specifications and alterations made within a scope equivalent to the scope of the claims that fall within the true spirit and scope of the invention.

What is claimed is:

1. An image data transmission apparatus, comprising:
   a) transmitting means for transmitting first information data and second information data; and
   b) control means for continuously adjusting and controlling an amount of the first information data which is transmitted by said transmitting means, in accordance with a reception state of said second information data on a reception side.

2. An apparatus according to claim 1, wherein said first information data is motion image data and said control means controls a transmission frame rate of the motion image data which is transmitted by said transmitting means.

3. An apparatus according to claim 1, wherein said first information data is motion image data, said second information data is audio data, and said control means controls a frame rate of said motion image data which is transmitted by said transmitting means in accordance with reception rates of said motion image data and said audio data.

4. An apparatus according to claim 3, wherein said control means controls the transmission frame rate of said motion image data so as to give a priority to said audio data than said motion image data.

5. An apparatus according to claim 3, wherein the reception rate of said motion image data is (the number of received frames)/(the number of transmitted frames).

6. An apparatus according to claim 1, wherein said transmitting means transmits said motion image data to a plurality of external terminals and said control means controls the transmission frame rate of said motion image data in accordance with the reception state of the image data of said plurality of external terminals.

7. An apparatus according to claim 2, further comprising adjusting means for manually adjusting the transmission frame rate of said motion image data.

8. An apparatus according to claim 1, further comprising display means for displaying the reception rate of said reception side.

9. An apparatus according to claim 2, wherein said image processing apparatus is used in a television conference system.

10. An information data processing apparatus connected to a plurality of terminal apparatuses for transmitting and receiving information data, comprising:
   a) input means for inputting reception rate data indicative of reception rates of the information data from the plurality of terminal apparatuses;
   b) deciding means for deciding and adjusting an amount of information data to be transmitted in accordance with the reception rate data; and
   c) transmitting means for transmitting control data to said plurality of terminal apparatuses, wherein the control data comprises data indicating the amount of the information data decided by said deciding means.

11. An apparatus according to claim 10, wherein said information data is motion image data and said deciding means decides a transmission frame rate of the motion image data.

12. An apparatus according to claim 10, wherein said information data is motion image data and audio data and said deciding means decides a transmission frame rate of said motion image data adjusted in accordance with the reception rates of the motion image data and the audio data.

13. An apparatus according to claim 12, wherein said deciding means decides the transmission frame rate of said motion image data so as to give a priority to said audio data than said motion image data.

14. An apparatus according to claim 11, wherein said image processing apparatus is used in a television conference system.

15. An image processing apparatus comprising:
   a) receiving means for receiving information data transmitted from at least one external terminal;
   b) calculating means for calculating a reception rate of the information data received by said receiving means, in accordance with every predetermined transmission time interval; and
   c) transmitting means for transmitting the thus-received rate data indicative of the reception rate calculated by said calculating means.

16. An apparatus according to claim 15, wherein said information data is motion image data.

17. An apparatus according to claim 15, wherein said information data is motion image data and audio data.

18. An apparatus according to claim 17, wherein said image processing apparatus is used in a television conference system.

19. An image data transmission method, comprising:
   a transmitting step for transmitting first information data and second information data; and
   a controlling step for continuously adjusting and controlling a data amount of the first information data which is transmitted in said transmitting step, in accordance with a reception state of the second information data on a reception side.

20. An information data processing method for use with a plurality of terminal apparatuses for transmitting and receiving information data, comprising:
   an input step for inputting reception rate data indicative of reception rates of said information data from said plurality of terminal apparatuses;
   a deciding step for deciding an amount of the information data to be transmitted in accordance with said reception rate data; and
   a transmitting step for transmitting a control signal to the plurality of terminal apparatuses, wherein the control data comprises data indicating the amount of the information data decided in said deciding step.

21. An image data processing method comprising:
   a receiving step for receiving information data transmitted from at least one external terminal;
   a calculating step for calculating a reception rate of the information data received in said receiving step, in accordance with every predetermined transmission time interval; and
   a transmitting step for transmitting the thus-received rate data indicative of the reception rate calculated in said calculating step.

22. An image data transmission apparatus, comprising:
   transmitting means for transmitting image data; and
   control means for continuously adjusting and controlling a transmission frame rate of the image data which is transmitted by said transmitting means, in accordance with a reception state of the image data on a reception side.

23. An apparatus according to claim 22, wherein said transmitting means further transmits audio data, and wherein said control means controls the transmission frame rate of the image data transmitted by said transmitting means in accordance with a reception state of the audio data on a reception side.

24. An apparatus according to claim 22, wherein the reception state of the image data comprises a number of received frames divided by a number of transmitted frames.

25. An apparatus according to claim 22, wherein said transmitting means transmits the image data to a plurality of external terminals, and wherein said control means controls the transmission frame rate of the image data in accordance with the reception rate of the image data of the plurality of external terminals.

26. An apparatus according to claim 22, further comprising adjusting means for manually adjusting the transmission frame rate of the image data.

27. An apparatus according to claim 22, further comprising display means for displaying the reception state of the reception side.

28. An apparatus according to claim 22, wherein said image processing apparatus is incorporated in a television conference system.

29. An image data transmission apparatus, comprising:
   transmitting means for transmitting image data and audio data; and
   control means for continuously adjusting and controlling a data amount of the image data which is transmitted by said transmitting means, in accordance with a reception state of the audio data on a reception side.

30. An apparatus according to claim 29, wherein said control means controls a transmission frame rate of the image data which is transmitted by said transmitting means.

31. An apparatus according to claim 29, wherein said image processing apparatus in incorporated in a television conference system.

32. An information data transmission apparatus, comprising:

transmitting means for transmitting information data to a plurality of external terminals; and     control means for continuously adjusting and controlling a data amount of the information data which is transmitted by said transmitting means, in accordance with a reception state of an image data on the plurality of external terminals.

33. An apparatus according to claim 32, wherein the information data comprises motion image data, and wherein said control means controls a transmission frame rate of the motion image data which is transmitted by said transmitting means.

34. An apparatus according to claim 32, wherein said image processing apparatus is incorporated in a television conference system.

35. An image data transmission method, comprising the steps of:

transmitting image data; and continuously adjusting and controlling a transmission frame rate of the image data which is transmitted in said transmitting step, in accordance with a reception rate of the image data on a reception side.

36. An image data transmission method, comprising the steps of:

transmitting image data and audio data; and continuously adjusting and controlling a data amount of the image data which is transmitted in said transmitting step, in accordance with a reception state of the audio data on a reception side.

37. An information data transmission method, comprising the steps of:

transmitting information data to a plurality of external terminals; and     continuously adjusting and controlling a data amount of the information data which is transmitted in said transmitting step, in accordance with a reception state of an image data on the plurality of external terminals.

\* \* \* \* \*

UNITED STATES PATENT AND TRADEMARK OFFICE
CERTIFICATE OF CORRECTION

PATENT NO. : 5,819,048

DATED : October 6, 1998

INVENTOR(S): HIROSHI OKAZAKI, ET AL.

It is certified that error appears in the above-identified patent and that said Letters Patent is hereby corrected as shown below:

On the title page,

Item [30] Foreign Application Priority Data:

"8-145733" should read --8-145735--.

Item [57] ABSTRACT:

Line 2, "ing" should read --ance--; and
Line 10, "appropriated" should read --appropriate--.

COLUMN 3:

Line 8, "102" should read --102 a--.

COLUMN 4:

Line 18, "in case" should read --in the case--; and
Line 31, "the case" should read --in the case--.

COLUMN 5:

Line 29, "was" should read --is--.

UNITED STATES PATENT AND TRADEMARK OFFICE
CERTIFICATE OF CORRECTION

PATENT NO. : 5,819,048

DATED : October 6, 1998

INVENTOR(S) : HIROSHI OKAZAKI ET AL.

It is certified that error appears in the above-identified patent and that said Letters Patent is hereby corrected as shown below:

COLUMN 8:

Line 31, "every" should read --any--.

Signed and Sealed this

Twenty-ninth Day of June, 1999

Attest:

Q. TODD DICKINSON

*Attesting Officer*     *Acting Commissioner of Patents and Trademarks*